US010747856B2

United States Patent
Mori

(10) Patent No.: US 10,747,856 B2
(45) Date of Patent: Aug. 18, 2020

(54) SETTING APPARATUS, SETTING METHOD, STORAGE MEDIUM, AND TERMINAL APPARATUS

(71) Applicant: Yokogawa Electric Corporation, Tokyo (JP)

(72) Inventor: Hiroshi Mori, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 296 days.

(21) Appl. No.: 15/834,318

(22) Filed: Dec. 7, 2017

(65) Prior Publication Data
US 2018/0173860 A1 Jun. 21, 2018

(30) Foreign Application Priority Data

Dec. 16, 2016 (JP) ................ 2016-244157

(51) Int. Cl.
G06F 21/31 (2013.01)
G06F 21/30 (2013.01)
(Continued)

(52) U.S. Cl.
CPC ......... G06F 21/31 (2013.01); G05B 19/0423 (2013.01); G05B 19/0426 (2013.01);
(Continued)

(58) Field of Classification Search
CPC ......... G06F 21/31; G06F 21/30; G06F 21/40; H04L 63/10; H04L 63/20; G05B 19/0423; G05B 19/0426
See application file for complete search history.

(56) References Cited

U.S. PATENT DOCUMENTS 7,010,450 B2 * 3/2006 Law .................. G05B 9/02
702/108
8,290,601 B2 * 10/2012 Oosako ............... G05B 19/042
340/10.52
(Continued)

FOREIGN PATENT DOCUMENTS

CN 104678866 A 6/2015
DE 10 2012 108 866 A1 3/2014
(Continued)

Primary Examiner — Saleh Najjar
Assistant Examiner — Devin E Almeida
(74) Attorney, Agent, or Firm — Sughrue Mion, PLLC

(57) ABSTRACT

A setting apparatus according to an aspect of the present invention includes an authenticator configured to authenticate an operator using a setting apparatus, the setting apparatus performing a setting of an I/O module including a plurality of first connectors to which field devices are connectable and a second connector to which a controller controlling the field devices is connectable, and an authorizer configured to assign operation authorization to the operator authenticated by the authenticator on the basis of previously set authorization definition information, the operation authorization allowing the operator to perform at least one operation using the setting apparatus, the authorization definition information including first information and second information, the first information defining whether or not a change of input and output information of the field device connected to each of the first connectors is permitted, the second information defining whether or not a change of each item of the input and output information is permitted on the basis of a role of the operator.

18 Claims, 11 Drawing Sheets

(51) Int. Cl.
*G05B 19/042* (2006.01)
*G06F 21/40* (2013.01)
*H04L 29/06* (2006.01)

(52) U.S. Cl.
CPC .............. *G06F 21/30* (2013.01); *G06F 21/40* (2013.01); *H04L 63/10* (2013.01); *H04L 63/20* (2013.01); *G05B 2219/21012* (2013.01); *G05B 2219/21062* (2013.01); *G05B 2219/25428* (2013.01); *G05B 2219/36542* (2013.01)

(56) References Cited

U.S. PATENT DOCUMENTS

| | | | | |
|---|---|---|---|---|
| 8,898,660 | B2 * | 11/2014 | Hieb | G06F 8/73 |
| | | | | 717/174 |
| 9,141,106 | B2 * | 9/2015 | De Groot | G05B 19/0425 |
| 9,164,501 | B2 * | 10/2015 | Bellville | G05B 19/0426 |
| 10,375,162 | B2 * | 8/2019 | Toepke | H04L 69/08 |
| 10,375,873 | B2 * | 8/2019 | Campbell | A01B 63/22 |
| 10,505,585 | B2 * | 12/2019 | Benson | H04L 12/10 |
| 10,599,134 | B2 * | 3/2020 | Benson | G05B 19/4186 |
| 2005/0071851 | A1 * | 3/2005 | Opheim | G06F 8/65 |
| | | | | 719/321 |
| 2015/0244697 | A1 * | 8/2015 | Siddesh | G05B 19/0428 |
| | | | | 726/7 |
| 2016/0110304 | A1 | 4/2016 | Mori et al. | |
| 2017/0257378 | A1 * | 9/2017 | Sprenger | G06F 21/31 |
| 2018/0026954 | A1 * | 1/2018 | Toepke | G06F 21/31 |

FOREIGN PATENT DOCUMENTS

| | | |
|---|---|---|
| JP | 2011221846 A | 11/2011 |
| JP | 2016-081415 A | 5/2016 |
| WO | 2016/020165 A1 | 2/2016 |

\* cited by examiner

FIG. 5

| ROLE / SCOPE OF WORK | I/O TAG | P&ID TAG | I/O TYPE | COMMUNICATION METHOD | DEVICE ADDRESS | DEVICE MODEL NAME | CHANNEL INFORMATION | I/O CHANNEL TEST RESULT | FIELD DEVICE TEST RESULT | ... | I/O PROTECTION |
|---|---|---|---|---|---|---|---|---|---|---|---|---|
|  | SYSTEM | SYSTEM | SYSTEM | FIELD | FIELD | FIELD | FIELD | FIELD | FIELD | ... | SYSTEM |
| SYSTEM ENGINEER | ☑ | ☑ | ☑ | ☑ | ☑ | ☑ | ☑ | ☑ | ☑ | ... | ☑ |
| FIELD ENGINEER | ☐ | ☐ | ☑ | ☑ | ☑ | ☑ | ☑ | ☐ | ☑ | ... | ☐ |
| TESTER | ☐ | ☐ | ☐ | ☐ | ☐ | ☐ | ☐ | ☐ | ☐ | ... | ☐ |

FIG. 6

|  ROLE / USER | SYSTEM ENGINEER | FIELD ENGINEER | TESTER |
|---|---|---|---|
| AAA | ☐ | ☑ | ☐ |
| BBB | ☑ | ☐ | ☐ |
| CCC | ☐ | ☐ | ☑ |

U1: USER column
AS: ROLE columns
L3

SETTING APPARATUS, SETTING METHOD, STORAGE MEDIUM, AND TERMINAL APPARATUS

BACKGROUND OF THE INVENTION

Field of the Invention

The present invention relates to a setting apparatus, a setting method, a storage medium, and a terminal apparatus.

The present application claims priority based on Japanese patent application 2016-244157, filed on Dec. 16, 2016 and includes herein by reference the content thereof.

Description of Related Art

In a plant, a factory, and the like, process control systems controlling various state amounts (for example, pressure, a temperature, a flow rate, and the like) in industrial processes are built, and high-level automatic operations have been realized. Generally, such a process control system has a configuration in which site devices (a measuring instrument and an operation device) called field devices are connected to a controller through an I/O module, and, the controller controls an operation device (for example, an actuator) in accordance with a measurement result acquired by a measuring instrument (for example, a sensor) such that the above-described various state amounts are controlled.

Generally, such a process control system is built through a factory acceptance test (FAT), a site acceptance test (SAT), and a system integration test (SIT). When such a process ends, a test run of the process control system built into a plant or the like is made, and, when the test run normally ends, the process proceeds to full operation.

In Japanese Unexamined Patent Application, First Publication No. 2016-081415 (hereinafter, referred to as "Patent Document 1"), an example of a method of building a process control system in the related art has been disclosed. More specifically, in Patent Document 1 presented below, an I/O module and field devices are installed to be wired at a site, and a method of setting the I/O module and the field devices by using a setting device connected to the I/O module in a state in which a controller is not connected to the I/O module has been disclosed. By using this method, a time required for building a process control system can be configured to be shorter than that of a conventional case.

SUMMARY OF THE INVENTION

Generally, a process control system is built in relation with various operators in each process. As a scale of a process control system to be built is increased, the number of operators relating to the building is also increased. Also in a case where an I/O module and field devices are set by using the method disclosed in the above-described Patent Document 1, in accordance with an increase in scale of a project and a short delivery period, a situation in which a plurality of operators perform setting by using a plurality of setting apparatuses is considered to occur more frequently.

Under such a situation, since a plurality of operators are in relation with a setting operation, there are some cases where the wastefully duplicated operations or an erroneous setting according to an operational mistake are occurred. For example, in a project for extending a plant, while it is necessary to set an I/O module and field devices that are newly installed, an I/O module and field devices that have already been installed do not need to be reset owing to the completion of settings and tests thereof. However, in a case where a setting operation for an I/O module and field devices that are not required to be reset by an operator is erroneously performed, the setting operation is completely wasteful. In a case where an operator performs an operational mistake in the middle of the execution of the setting operation, an erroneous setting is also made.

Under the above-described situation, operators having various skills are mixed. Examples of operators who are in relation with the setting of I/O modules and field devices include a system engineer, a field engineer, and a tester. Under the above-described situation, in a case where operational content (operation authorization) that can be performed according to skills of an operator is defined and the operation authorization is managed according to the skills of the operator, the situation is considered to lead to the prevention of a wastefully overlapped operation and an erroneous setting due to the above-described operational mistake.

One aspect of the present invention provides a setting apparatus, a setting method, a storage medium, and a terminal apparatus capable of effectively preventing a wasteful operation or an erroneous setting and appropriately managing an operator in accordance with his or her skills.

A setting apparatus according to a first aspect of the present invention may include an authenticator configured to authenticate an operator using a setting apparatus, the setting apparatus performing a setting of an I/O module including a plurality of first connectors to which field devices are connectable and a second connector to which a controller controlling the field devices is connectable, and an authorizer configured to assign operation authorization to the operator authenticated by the authenticator on the basis of previously set authorization definition information, the operation authorization allowing the operator to perform at least one operation using the setting apparatus, the authorization definition information including first information and second information, the first information defining whether or not a change of input and output information of the field device connected to each of the first connectors is permitted, the second information defining whether or not a change of each item of the input and output information is permitted on the basis of a role of the operator.

In the above-described setting apparatus, the second information may include information representing scope of work for each item of the input and output information. The scope of work may define which role an operation is assigned to, the operation being associated with each item of the input and output information. The authorizer may be configured to assign the operation authorization to the operator on the basis of the scope of work.

In the above-described setting apparatus, the authorization definition information may further include third information in which the operator and the role of the operator are associated with each other.

The above-described setting apparatus may further include a storage storing the authorization definition information. The authorizer may be configured to assign the operation authorization to the operator on the basis of the authorization definition information read from the storage.

In the above-described setting apparatus, the first information may be stored in the storage in association with the input and output information of each of the first connectors.

The above-described setting apparatus may further include an acquirer configured to acquire the authorization definition information from the outside of the setting apparatus.

In the above-described setting apparatus, the authorizer may be configured to assign to the operator the operation authorization of changing the input and output information of the field device connected to the first connector in which the change of the input and output information is permitted in the first information.

In the above-described setting apparatus, the authorizer may be configured to assign to the operator the operation authorization of changing the item of the input and output information in which the change of the item is permitted on the basis of the role of the operator in the second information.

In the above-described setting apparatus, the authorizer may be configured to assign to the operator the operation authorization of changing the item of the input and output information when the change of the item is permitted on the basis of the role of the operator in the second information and the role of the operator is included in the scope of work.

In the above-described setting apparatus, the authorizer may be configured not to assign to the operator the operation authorization of changing the item of the input and output information when the change of the item is permitted on the basis of the role of the operator in the second information and the role of the operator is not included in the scope of work.

A setting method according to a second aspect of the present invention may use a setting apparatus performing a setting of an I/O module including a plurality of first connectors to which field devices are connectable and a second connector to which a controller controlling the field devices is connectable. The setting method may include authenticating an operator using the setting apparatus, and assigning operation authorization to the operator authenticated on the basis of previously set authorization definition information, the operation authorization allowing the operator to perform at least one operation using the setting apparatus, the authorization definition information including first information and second information, the first information defining whether or not a change of input and output information of the field device connected to each of the first connectors is permitted, the second information defining whether or not a change of each item of the input and output information is permitted on the basis of a role of the operator.

In the above-described setting method, the second information may include information representing scope of work for each item of the input and output information, the scope of work defining which role an operation is assigned to, the operation being associated with each item of the input and output information. Assigning the operation authorization to the operator may include assigning the operation authorization to the operator on the basis of the scope of work.

In the above-described setting method, the authorization definition information may further include third information in which the operator and the role of the operator are associated with each other.

In the above-described setting method, the setting apparatus may further include a storage storing the authorization definition information. Assigning the operation authorization to the operator may include assigning the operation authorization to the operator on the basis of the authorization definition information read from the storage.

In the above-described setting method, the first information may be stored in the storage in association with the input and output information of each of the first connectors.

The above-described setting method may further include acquiring the authorization definition information from the outside of the setting apparatus.

In the above-described setting method, assigning the operation authorization to the operator may include assigning to the operator the operation authorization of changing the input and output information of the field device connected to the first connector in which the change of the input and output information is permitted in the first information.

A non-transitory computer-readable storage medium according to a third aspect of the present invention may store a setting program causing a computer to function as a setting apparatus that performs a setting of an I/O module including a plurality of first connectors to which field devices are connectable and a second connector to which a controller controlling the field devices is connectable. The setting program may cause the computer to authenticate an operator using the setting apparatus, and assign operation authorization to the operator authenticated on the basis of previously set authorization definition information, the operation authorization allowing the operator to perform at least one operation using the setting apparatus, the authorization definition information including first information and second information, the first information defining whether or not a change of input and output information of the field device connected to each of the first connectors is permitted, the second information defining whether or not a change of each item of the input and output information is permitted on the basis of a role of the operator.

A terminal apparatus according to a fourth aspect of the present invention may generate the authorization definition information to be used by the above-described setting apparatus using design information of at least the field devices, the I/O module, and the controller stored in a database.

In the above-described terminal apparatus, the terminal apparatus may be configured to copy the authorization definition information and input the copied authorization definition information into the setting apparatus when the setting apparatus is connected to the terminal apparatus.

According to one aspect of the present invention, an operator using a setting apparatus is authenticated, and operation authorization of an operation that can be performed by the authenticated operator, by using the setting apparatus is assigned on the basis of previously set authorization definition information. The authorization definition information includes, for example, first information defining whether or not a change of input and output information is enabled for each of first connectors disposed in an I/O module and second information defining whether or not a change of content is enabled according to a role of the operator for each item of the input and output information. For this reason, a wasteful operation and an erroneous setting can be effectively prevented, and an operator can be appropriately managed according to his or her skills.

BRIEF DESCRIPTION OF THE DRAWINGS

FIG. 5 is a diagram showing one example of an authorization list used by a setting apparatus according to one embodiment of the present invention;

FIG. 6 is a diagram showing one example of a user list used by a setting apparatus according to one embodiment of the present invention;

DETAILED DESCRIPTION OF THE INVENTION

Hereinafter, a setting apparatus, a setting method, a storage medium, and a terminal apparatus according to one embodiment of the present invention will be described in detail with reference to the drawings.

[Process Control System]

Figure 1:
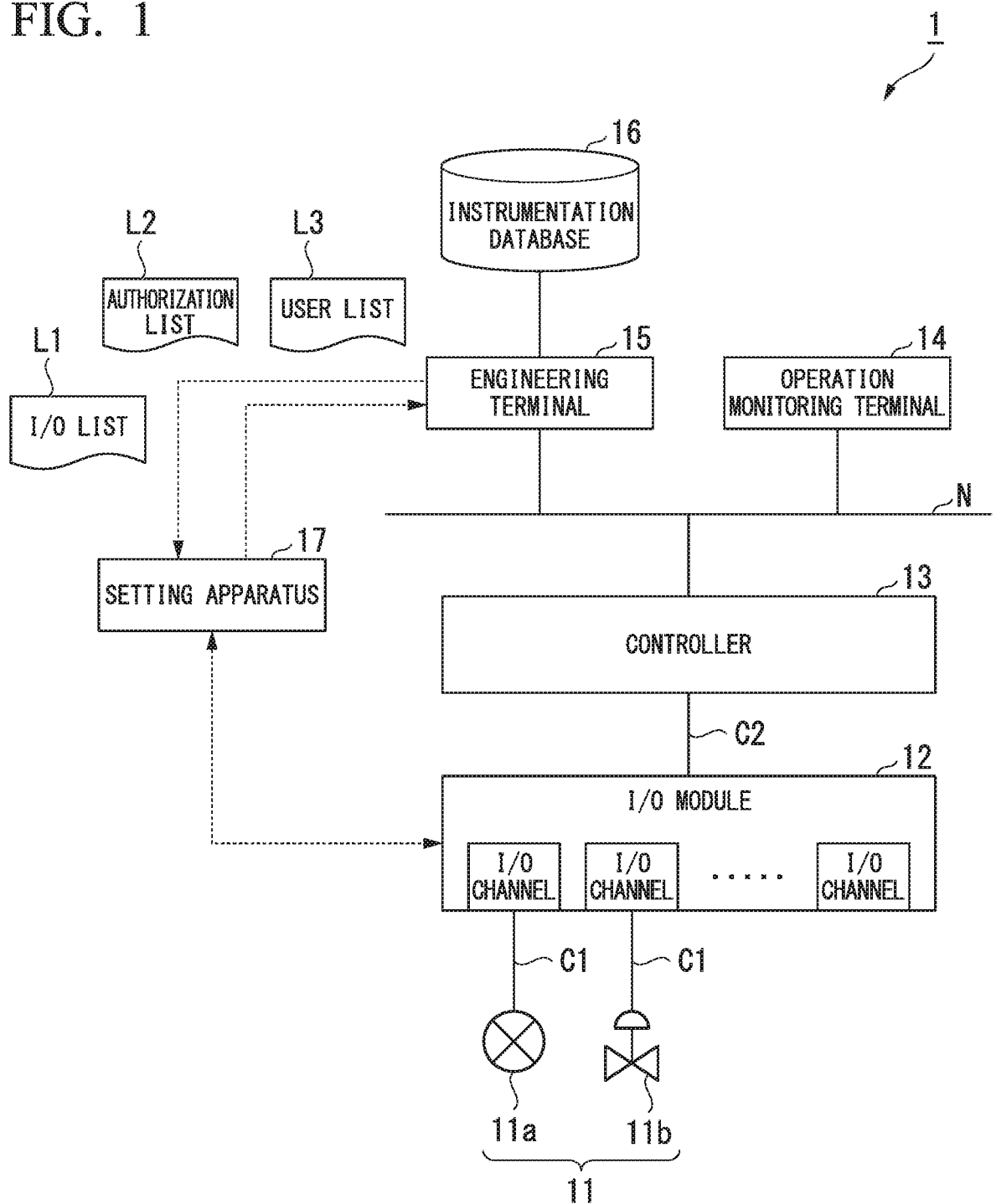
FIG. 1 is a block diagram showing a whole configuration of a process control system.

FIG. 1 is a block diagram showing a whole configuration of a process control system. As shown in FIG. 1, a process control system 1 includes a field device 11, an I/O module 12, a controller 13, an operation monitoring terminal 14, an engineering terminal 15, and an instrumentation database 16 (database). The process control system 1 controls an industrial process realized by a plant (not shown in the drawing) by using the controller 13 to control the field devices 11 in accordance with an instruction from the operation monitoring terminal 14 or the like. While details will be described later, the process control system 1 is built while performing various settings of the I/O module 12 and the field device 11 by using the setting apparatus 17.

The field device 11 and the I/O module 12 are connected through a transmission line C1, and the I/O module 12 and the controller 13 are connected through a cable C2. The controller 13, the operation monitoring terminal 14, the engineering terminal 15, and the instrumentation database 16 are connected to a control network N. The control network N, for example, is a network that connects a site of the plant and a monitoring room.

The field device 11, for example, is a sensor device such as a flowmeter or a temperature sensor, a valve device such as a flow control valve or an opening/closing valve, an actuator device such as a fan or a motor, or any other device installed at the site of the plant. In this embodiment, to facilitate understanding, a case where a state amount to be controlled in an industrial process is a flow rate of a fluid will be described as an example. For this reason, FIG. 1 shows one sensor device 11a measuring the flow rate of the fluid and one valve device 11b controlling (operating) the flow rate of the fluid among a plurality of field devices 11 installed in the plant.

The I/O module 12 is disposed between the field device 11 and the controller 13, to which the plurality of field devices 11 can be connected, and processes signals are input/output between the connected field device 11 and the controller 13. For example, the I/O module 12 performs a process of converting a signal acquired from the field device 11 into a signal that can be received by the controller 13. This I/O module 12 may be regarded as a module that connects the plurality of field devices 11 to the controller 13 and relays signals input/output by the field device 11 and signals input/output by the controller 13. Details of the I/O module 12 will be described later.

The controller 13 communicates with the field device 11 in accordance with an instruction from the operation monitoring terminal 14 or the like to control the field device 11. More specifically, the controller 13 acquires a process value measured by a certain field device 11 (for example, the sensor device 11a) and calculates and transmits an operation amount of another field device 11 (for example, the valve device 11b) to control the other field device 11 (for example, the valve device 11b).

The operation monitoring terminal 14 is a terminal that is operated, for example, by an operator of the plant and is used for monitoring the process. More specifically, the operation monitoring terminal 14 acquires input/output data of the field device 11 from the controller 13, transmits behaviors of the field device 11 and the controller 13 configuring the process control system 1 to the operator, and controls the controller 13 on the basis of an operator's instruction.

The engineering terminal 15 generates information to be set in the field device 11, the I/O module 12, and the controller 13 on the basis of design information stored in the instrumentation database 16. The design information includes design information of the plant including design information of at least the field device 11, the I/O module 12, and the controller 13 in the process control system 1. As the information generated by this engineering terminal 15, there are an I/O list L1, an authorization list L2, and a user list L3 (authorization definition information). In a case where the setting apparatus 17 is connected to the engineering terminal 15, the engineering terminal 15 copies the I/O list L1, the authorization list L2, and the user list L3 and outputs the lists to the setting apparatus 17.

The I/O list L1 has information relating to input/output between the field device 11 and the I/O module 12. The I/O list L1 is not limited to the information relating to the input/output and may include at least one of an operation condition setting specific to the field device, I/O channel protection information, a test result, and the like in addition to the above-described information. The authorization list L2 (second information) is information relating to authorization according to a role of an operator. The user list L3 (third information) is information relating to the operator. The reason for generating the authorization list L2 and the user list L3 using the engineering terminal 15 is that a range in which the I/O list L1 can be changed according to the role of the operator is precisely limited. Details of the I/O list L1, the authorization list L2, and the user list L3 will be described later.

The operator's above-described role represents, so to speak, an occupation category of the operator (or skills of the operator) and examples thereof are a system engineer, a field engineer, and a tester. The system engineer, for example, is an engineer directing design, building, testing, or the like of the process control system 1, the field engineer, for example, is an engineer operating at the site of the plant, and the tester, for example, is an engineer performing various tests at the site of the plant. The instrumentation database 16 stores the above-described design information referred to by the engineering terminal 15. The instrumentation database 16 may store the same list as the I/O list L1 generated by the engineering terminal 15.

The setting apparatus 17 is an apparatus for performing various settings for the field device 11 and the I/O module 12 by using the I/O list L1, the authorization list L2, and the user list L3 acquired from the engineering terminal 15 when the process control system 1 is built. In this embodiment, by using the setting apparatus 17, even in a state in which the controller 13 is not connected to the I/O module 12, setting and adjustment for the field device 11 and the I/O module 12, a connection test between the field device 11 and the I/O module 12, and the like can be performed.

The setting apparatus 17 performs authentication of an operator using the setting apparatus 17 and assigns operation authorization of an operation that can be performed by the authenticated operator using the setting apparatus 17 on the basis of the I/O list L1, the authorization list L2, and the user list L3. The assigning of such operation authorization is for appropriately managing the operator in accordance with his or her skills and effectively preventing a wasteful operation and an erroneous setting. Details of the setting apparatus 17 will be described later.

[I/O Module]

Figure 2:
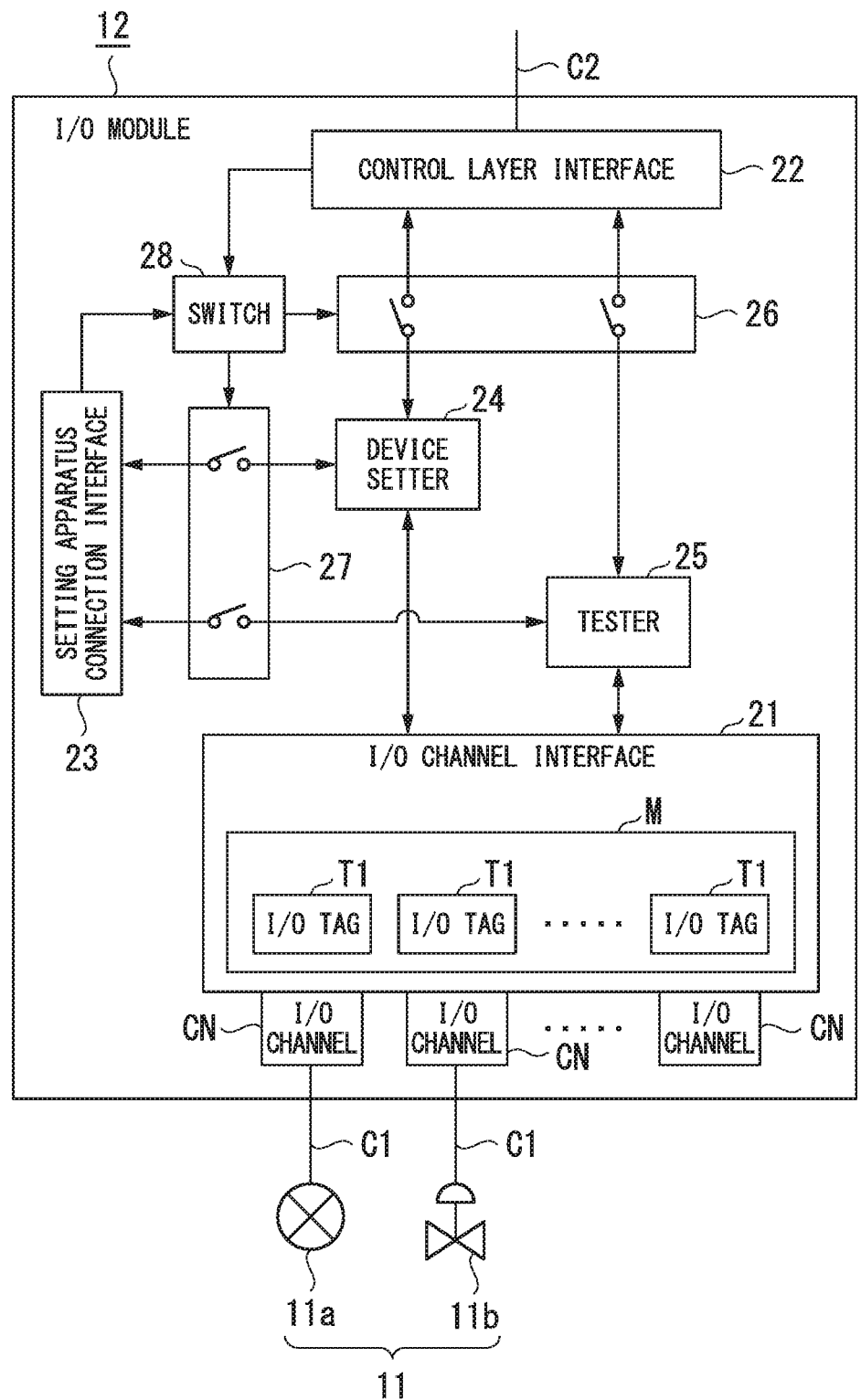
FIG. 2 is a block diagram showing a main configuration of an I/O module.

FIG. 2 is a block diagram showing a main configuration of the I/O module. As shown in FIG. 2, the I/O module 12 includes an I/O channel interface 21, a control layer interface 22 (second connector), a setting apparatus connection interface 23, a device setter 24, a tester 25, a switch 26, a switch 27, and a switch 28.

The I/O channel interface 21 includes a plurality of I/O channels CN (first connectors) to which field devices 11 are connected, and exchanges various signals with the field devices 11 connected to the I/O channels CN. This I/O channel interface 21 includes a memory M storing an I/O tag T1 (tag information) set for each of the I/O channels CN by the device setter 24 on the basis of an instruction from the setting apparatus 17.

Each of the I/O channels CN can perform an input of an analog signal from the field device 11, an output of an analog signal to the field device 11, an input (discrete input) of a digital signal from the field device 11, and an output (discrete output) of a digital signal to the field device 11, or perform an input (discrete input) of a digital signal from the field device 11 and an output (discrete output) of a digital signal to the field device 11. One of the above-described inputs/outputs to be performed by the I/O channel CN is set by the device setter 24 on the basis of an instruction from the setting apparatus 17.

The control layer interface 22 is connected to the cable C2 and exchanges various signals with the controller 13 disposed in a control layer through the cable C2. The setting apparatus connection interface 23 exchanges various signals with the connected setting apparatus 17 through a connection cable, which is not shown in the drawing, or a radio connection. As this setting apparatus connection interface 23, for example, a wired interface such as a universal serial bus (USB) or Ethernet (registered trademark) or a radio interface performing radio communication compliant with a radio communication standard such as Wi-Fi (registered trademark) or Bluetooth (registered trademark) may be used.

The device setter 24 performs various settings of the I/O channel interface 21 and various settings of the field device 11 on the basis of a setting instruction from the setting apparatus 17 that is input through the setting apparatus connection interface 23 or a setting instruction from the controller 13 that is input through the control layer interface 22. For example, the device setter 24 sets the I/O tag T1 for each of the I/O channels CN on the basis of a setting instruction from the setting apparatus 17 that is input through the setting apparatus connection interface 23.

The device setter 24 performs a setting related to input/output of the I/O channel CN by using the above-described I/O tag T1 on the basis of the setting instruction from the setting apparatus 17 that is input through the setting apparatus connection interface 23. More specifically, the device setter 24 sets each of the I/O channels CN to perform one of an input of an analog signal from the field device 11, an output of an analog signal to the field device 11, an input of a digital signal from the field device 11, and an output of a digital signal to the field device 11.

The device setter 24 performs a setting of the field device 11 connected to the I/O channel CN for which the above-described setting is performed using the above-described I/O tag T1 on the basis of the setting instruction from the setting apparatus 17 that is input through the setting apparatus connection interface 23. Examples of the setting performed for the field device 11, for example, include a setting of an address (device address) unique to each of the field devices 11 and a setting of an operation condition unique to each of the field devices 11.

In a case where a checking instruction from the setting apparatus 17 is input through the setting apparatus connection interface 23 or in a case where a checking instruction from the controller 13 is input through the control layer interface 22, the tester 25 performs a checking test of states of the I/O channel CN and the field device 11. For example, the tester 25 performs a checking test for checking whether or not the setting relating to the input/output of the I/O channel CN is normally performed, whether or not a connection between the I/O channel CN and the field device 11 is normally performed, or the like. In a case where the checking test of the states of the I/O channel CN and the field device 11 is performed mainly by the setting apparatus 17, the tester 25 performs only a relay of various signals that are transmitted/received between the setting apparatus 17 and the I/O channel interface 21.

The switch 26 causes an open state or a closed state between the control layer interface 22 and the device setter 24 and the tester 25 in accordance with an instruction from the switch 28. The switch 27 causes the open state or the closed state between the setting apparatus connection interface 23 and the device setter 24 and the tester 25 in accordance with the instruction from the switch 28. These switches 26 and 27 may be either mechanical switches or switches realized by software. The switch 28 sets one of the switches 26 and 27 to be in the closed state and sets the other switch to be in the open state on the basis of an instruction from the controller 13 that is input through the control layer interface 22 or an instruction from the setting apparatus 17 input through the setting apparatus connection interface.

[Setting Apparatus]

Figure 3:
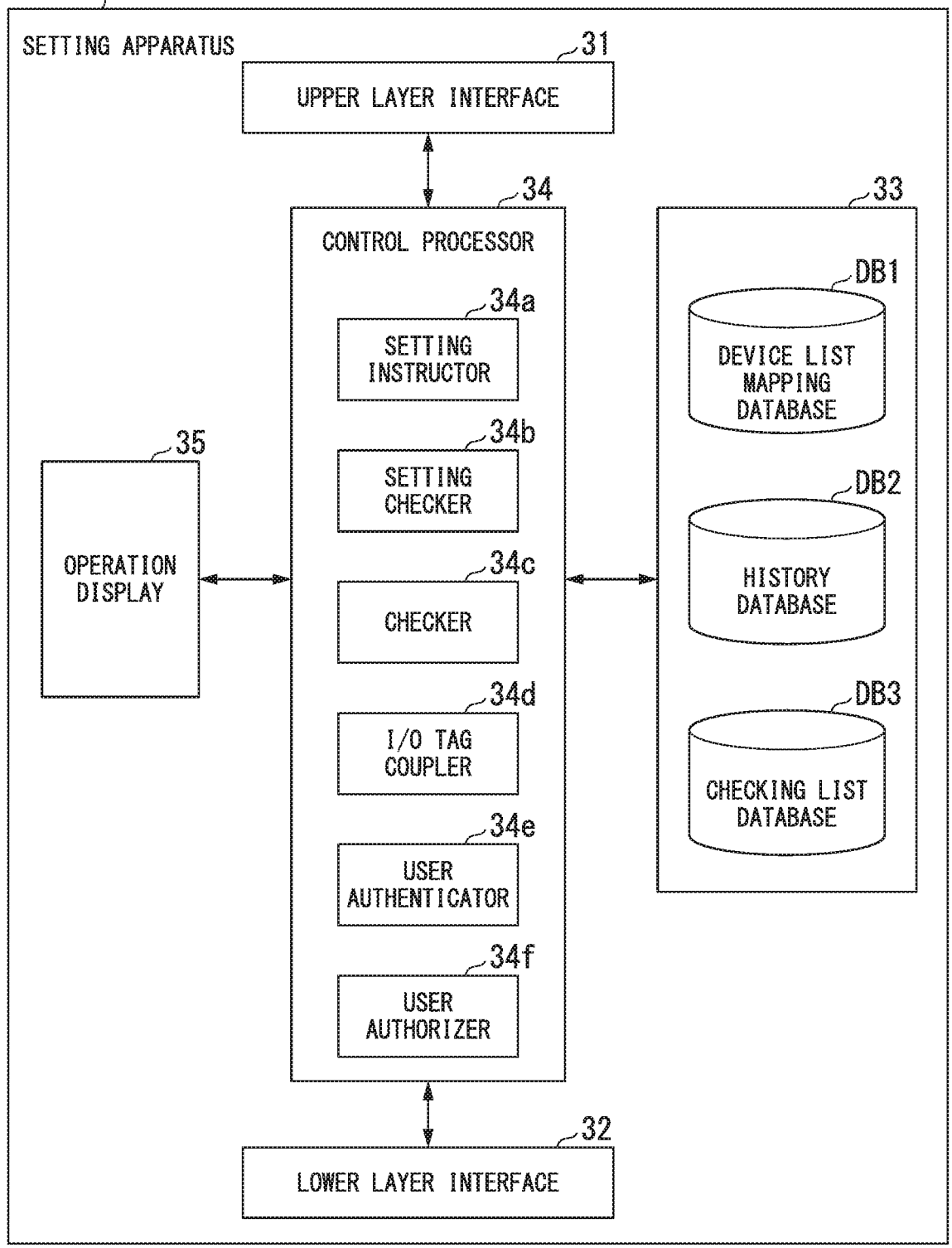
FIG. 3 is a block diagram showing a main configuration of a setting apparatus according to one embodiment of the present invention.

FIG. 3 is a block diagram showing a main configuration of the setting apparatus according to one embodiment of the present invention. As shown in FIG. 3, the setting apparatus 17 includes an upper layer interface 31 (acquirer), a lower layer interface 32, a storage 33, a control processor 34, and an operation display 35. Such a setting apparatus 17, for example, is realized by a desktop type, notebook type, or tablet type personal computer.

The upper layer interface 31 is connected to the engineering terminal 15 (higher-rank apparatus) located at a higher rank than the controller 13 and exchanges various kinds of information with the engineering terminal 15. For example, the upper layer interface 31 receives (obtains) the I/O list L1, which is information relating to input/output between the field device 11 and the I/O module 12, the authorization list L2, which is information relating to authorization according to a role of an operator, and the user list L3 (see FIG. 1), which is information relating to the operator, from the engineering terminal 15. The upper layer interface 31 may be either directly connected to the engineering terminal 15 or indirectly connected to the engineering terminal 15 through the control network N. The higher layer interface 31 may be connected to the engineering terminal 15 that is in an offline state.

The lower layer interface 32 is connected to the setting apparatus connection interface 23 of the I/O module 12 and exchanges various kinds of information with the I/O module 12. As this lower layer interface 32, similar to the setting apparatus connection interface 23 disposed in the above-described I/O module 12, a wired interface or a radio interface may be used. The upper layer interface 31 and the lower layer interface 32 described above may be realized by a single interface.

The storage 33, for example, includes an external storage device such as a hard disk and stores a device list mapping database DB1, a history database DB2, and a checklist database DB3. The storage 33 stores the I/O list L1, the authorization list L2, and the user list L3 acquired from the engineering terminal 15. The device list mapping database DB1 is a database in which various setting values (designed setting values and actual setting values) of the field device 11 and the I/O module 12, wiring information representing wirings of the field device 11 and the I/O module 12, positional information representing positions, and the like are stored.

The history database DB2 is a database in which operation histories (histories associating each specific piece of operation content and a date and time at which an operation is performed) relating to operations performed for the field device 11 and the I/O module 12 are stored. In this history database DB2, for example, information acquired by adding information (time information) representing a time at which a checking test is performed to information (checking information) acquired by performing a checking test of states of the I/O channel CN and the field device 11 is stored.

The check list database DB3 is a database in which information (checking information) defining items (check items) to be checked for the field device 11 or the I/O module 12 and a sequence (checking sequence) and a result thereof are stored. In this check list database DB3, as the above-described checking items, for example, "input checking," "output checking," "input loop checking," "output loop checking," and the like are stored. "Input checking" and "output checking" are items used for checking types (identifications of a current input, a pulse input, an mV input, a thermocouple input, or the like) of input/output signals.

The control processor 34 integrally controls the operation of the setting apparatus 17 and performs processes required for performing various settings of the field device 11 and the I/O module 12. This control processor 34 includes a setting instructor 34a, a setting checker 34b, a checker 34c, an I/O tag coupler 34d, a user authenticator 34e (an authenticator or an authentication means), and a user authorizer 34f (an authorizer or an authorization assigning means). The setting instructor 34a performs a setting of instructions for the I/O module 12 and the field device 11 through the lower layer interface 32 by using information of each of the databases stored in the storage 33.

The setting checker 34b performs a checking of instructions for the I/O module 12 and the field device 11 through the lower layer interface 32. The setting checker 34b compares information acquired from the lower layer interface 32 by performing the checking of instructions with the information of each of the databases stored in the storage 33. Then, the setting checker 34b causes the operation display 35 to display a result of the comparison or notifies the engineering terminal 15 of the result through the higher layer interface 31.

The checker 34c, similar to the tester 25 of the I/O module 12, performs a checking test of the states of the I/O channel CN and the field device 11. More specifically, the checker 34c performs a checking test of the states of the I/O channel CN and the field device 11 on the basis of the checking information stored in the check list database DB3 of the storage 33. For example, the checker 34c performs a checking test for checking whether or not a setting related to the input/output of the I/O channel CN is normally performed, whether or not a connection between the I/O channel CN and the field device 11 is normally performed, or the like.

The checker 34c stores information acquired by adding information (time information) representing a time at which the checking test is performed to information (checking information) acquired by performing the checking test of the states of the I/O channel CN and the field device 11 in the history database DB2. The reason for storing such information in the history database DB2 is that a time at which a certain checking test is performed for the I/O channel CN and the field device 11 and a result thereof are stored.

The checker 34c causes the operation display 35 to display progress information representing a status of the checking test of the states of the I/O channel CN and the field device 11 or notifies the progress information to the outside (for example, the engineering terminal 15) from the upper layer interface 31. The checking test may be performed in parallel for a plurality of I/O modules 12. As the progress information is displayed on the operation display 35, the status of the checking test of the I/O module 12 and the field device 11 to which the setting apparatus 17 is connected can be checked. As the progress information is notified to the outside (for example, the engineering terminal 15), statuses (statuses of the checking tests of the plurality of I/O modules 12 and field devices 11) of all checking tests (or checking tests within a target range) can be checked.

The I/O tag coupler 34d associates an I/O tag T2 (see FIG. 4B) used by the controller 13 with the I/O tag T1 set for each of the I/O channels CN of the I/O module 12. While details will be described later, the I/O tag T1 is included in an I/O list L11 (see FIG. 4A) forming a part of the I/O list L1 shown in FIG. 1, and the I/O tag T2 is included in an I/O list L12 (see FIG. 4B) forming a part of the I/O list L1 shown in FIG. 1. The reason for associating the I/O tags T1 and T2 using the I/O tag coupler 34d is that input and output information J1 (see FIG. 4A) for the I/O channel CN is combined with input and output information J2 (see FIG. 4B) for the field device 11 connected to the I/O channel CN.

The user authenticator 34e performs authentication of an operator using the setting apparatus 17. For example, the user authenticator 34e performs the authentication of the operator using the setting apparatus 17 by collating a user ID and a password for authentication input from the operation display 35 with a user ID and a password for authentication that are stored in advance. The user authorizer 34f assigns operation authorization of an operation that can be performed by the operator authenticated by the user authenticator 34e using the setting apparatus 17 on the basis of the I/O list L1, the authorization list L2, and the user list L3 read from the storage 33. Details of an assignment of specific operation authorization performed by the user authorizer 34f will be described later.

The operation display 35 includes, for example, a touch panel type liquid crystal display device having both a display function and an operation function, displays various kinds of information output from the control processor 34, and, in a case where an operation is performed on a display surface of the liquid crystal display device, outputs an operation signal according to the operation to the control processor 34. In the operation display 35, for example, like a liquid crystal display device and a keyboard, a display function and an operation function may be physically divided.

Each block (the setting instructor 34a, the setting checker 34b, the checker 34c, the I/O tag coupler 34d, the user authenticator 34e, and the user authorizer 34f) disposed in the above-described control processor 34 is realized as a program used for realizing each function, and the program is executed by a central processing unit (CPU) disposed in a computer. In other words, each of the blocks disposed in the control processor 34 is realized by incorporating software and hardware resources.

The program realizing the above-described function, for example, may be distributed in a state being recorded in a computer-readable storage medium such as a CD-ROM or a DVD (registered trademark)-ROM, or may be distributed through an external network such as the Internet. The above-described various functions implemented in the control processor 34 of the setting apparatus 17 are realized through software by reading and installing a program recorded in a storage medium or installing a program downloaded through an external network.

<I/O List>

Figure 4A:
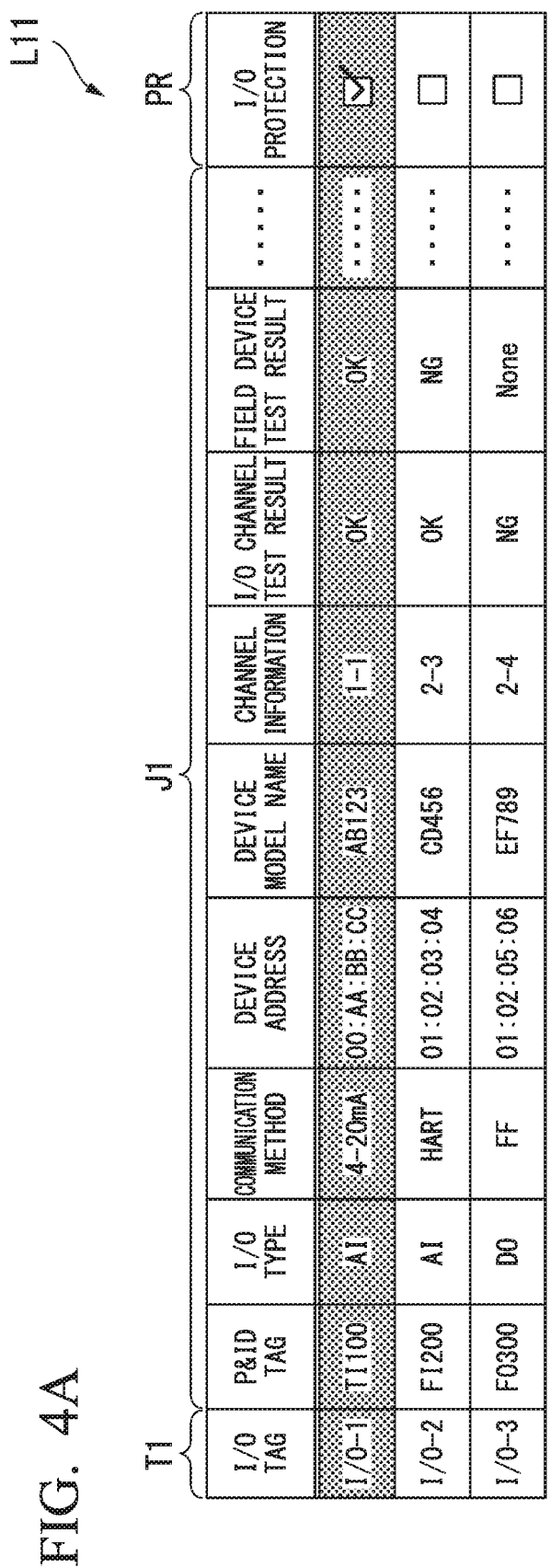
FIGS. 4A and 4B are diagrams showing examples of an I/O list used by a setting apparatus according to one embodiment of the present invention.
Figure 4B:
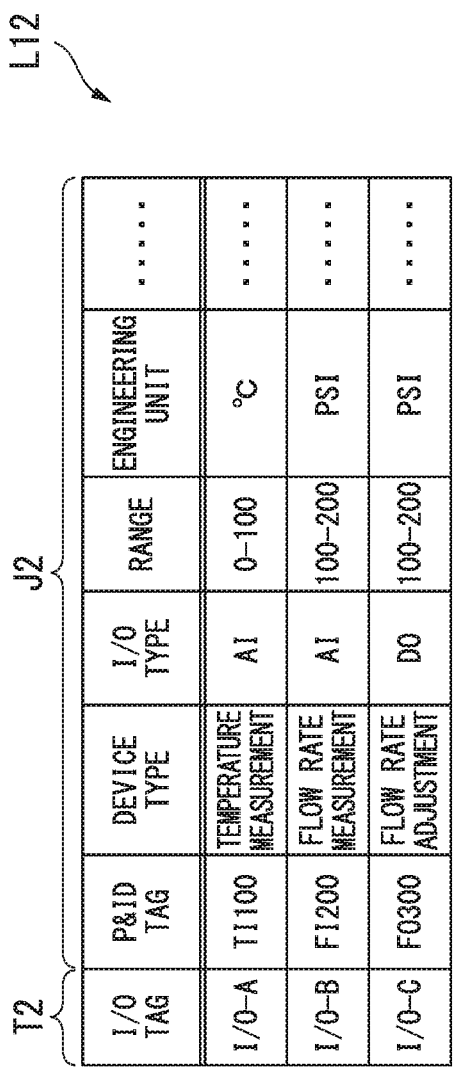

FIGS. 4A and 4B are diagrams showing examples of the I/O list used by a setting apparatus according to one embodiment of the present invention. The I/O list L1 includes the I/O list L11 shown in FIG. 4A and the I/O list L12 shown in FIG. 4B. The I/O list L1, as shown in FIG. 1, is generated by the engineering terminal 15 on the basis of the design information stored in the instrumentation database 16, and is received by the setting apparatus 17.

The I/O list L11 shown in FIG. 4A is a list in which the input and output information J1 and I/O protection information PR (first information) is associated with the I/O tag T1 set for each of the I/O channels CN of the I/O module 12. The input and output information J1 is information relating to input/output and the like of the field device 11 connected to each of the I/O channels CN. In the example shown in FIG. 4A, items of the input and output information J1 include "P&ID tag," "I/O type," "communication method," "device address," "device model name," "channel information," "I/O channel test result," "field device test result," and the like.

"P&ID tag" is a tag that is used for logically representing each of the I/O channels CN disposed at the I/O module 12 in a piping and instrumentation diagram (P&ID) of a plant. "I/O type" is information that represents the type (input (AI) of an analog signal, output (AO) of an analog signal, input (DI) of a digital signal, output (DO) of a digital signal, or the like) of input/output of the field device 11.

"Communication method" is information that represents a communication method used by the field device 11. In the example shown in FIG. 4A, a communication method using a 4 to 20 mA signal, a communication method compliant with HART (registered trademark), and a communication method compliant with Foundation Fieldbus (FF; registered trademark) are shown. "Device address" is information representing an address that is assigned to the field device 11, "device model name" is information representing a model (model name) of the field device 11, and "channel information" is information representing a communication channel used by the field device 11.

"I/O channel test result" is a test result of testing (for example, a checking test of a state) performed for each of the I/O channels CN, and "field device test result" is a test result of testing (for example, a checking test of a state) performed for the field device 11 connected to each of the I/O channels CN. In the example shown in FIG. 4A, each of the I/O channel test result and the field device test result includes "OK" representing success, "NG" representing failure, "None" representing an indication of no test result, or the like.

The I/O protection information PR defines whether or not changing (editing) of the input and output information J1 associated with the I/O tag T1 is enabled. This I/O protection information PR defines whether or not changing of "I/O channel test result" and "field device test result" included in the input and output information J1 is enabled, and accordingly, the I/O protection information PR also defines whether or not testing of the I/O channel CN to which the I/O tag T1 is set is enabled. In other words, the I/O protection information PR is for defining whether or not the state of the I/O channel CN is protected.

In the example shown in FIG. 4A, as the I/O protection information PR, there is the presence/absence of an I/O protection flag ("checked check box" and "unchecked check box"). In a case where the I/O protection flag is present (in the case of "checked check box"), the state of the I/O channel CN is protected. On the other hand, in a case where the I/O protection flag is not present (in the case of "unchecked check box"), the state of the I/O channel CN is not protected. In a case where the I/O list L11 is displayed by the engineering terminal 15 or the setting apparatus 17, as shown in FIG. 4A, a row in which the I/O protection flag is present, for example, is in a grayed-out state in which content cannot be changed without authorization. A person having authorization for setting (changing) the I/O protection flag, for example, is a system engineer.

The I/O list L12 shown in FIG. 4B is a list in which the tag T2 used by the controller 13 for logically identifying each of the I/O channels CN of the I/O module 12 and the input and output information J2 for the I/O channel CN are associated with each other. In the example shown in FIG. 4B, the items of the input and output information J2 of each I/O channel CN include "P&ID tag," "device type," "I/O type," "range," "engineering unit," and the like. The I/O list L12 may be either a list in which an item of I/O protection information is provided or a list that is integrated with the I/O list L11. In addition, the input and output information J2 cannot be changed by a field engineer or a tester (an operator whose scope of work to be described later is set to the field side) regardless of the presence/absence of a check of the I/O protection information.

"P&ID tag" and "I/O type" are similar to those included in the input and output information J1 of the I/O list L11. "Device type" is information representing the function of the field device 11 connected to the I/O channel CN. In the example shown in FIG. 4B, a temperature measurement, a flow rate measurement, a flow rate adjustment, and the like are shown as examples. "Range" is information representing the range of the magnitude of signals input or output through the I/O channel CN. "Engineering unit" is information representing the unit of signals that are input or output through the I/O channel CN. For example, in a case where signals that are input or output through the I/O channel CN are signals representing temperatures, "engineering unit" is defined as "° C."

<Authorization List>

FIG. 5 is a diagram showing one example of the authorization list used by a setting apparatus according to one embodiment of the present invention. The authorization list L2, as shown in FIG. 1, is generated by the engineering terminal 15 on the basis of the design information stored in the instrumentation database 16, and is received by the setting apparatus 17. The authorization list L2 is used for limiting a range in which the I/O list L1 can be changed in units of items (the I/O tag T1, each item of the input and output information J1, and the I/O protection information PR) of the I/O list L1 in accordance with a role of an operator. In other words, the authorization list L2 is used for assigning the authorization to change the I/O list L1 in accordance with the role of the operator in units of the above-described items of the I/O list L1.

As shown in FIG. 5, the authorization list L2 is a list in which enable/disable information ED defining whether or not a change of each item of the I/O list L1 can be performed is associated with an operator's role Q1. In the example shown in FIG. 5, the operator's role Q1 includes "system engineer," "field engineer," and "tester." In the example shown in FIG. 5, as the enable/disable information ED, there is the presence/absence of a permission flag ("checked check box" and "unchecked check box") for each combination of the operator's role Q1 and an item of the I/O list L1. The operator's role "field engineer" may be subdivided for each responsible facility such as a sensor, a valve, a transmitter, or the like, and the authorization may be set for each of the subdivided roles.

In a case where the permission flag is present (in the case of "checked check box"), it indicates that a change of the item of the column is permitted for the operator's role of the row. On the other hand, in a case where the permission flag is absent (in the case of "unchecked check box"), it indicates that a change of the item of the column is not permitted for the operator's role of the row. However, even in the case where the permission flag is present, in a case where scope of work is not included in scope of work (information defining which role of operator an operation is assigned to, which is associated with each of the items of the I/O list L1) defined in advance, a change is not permitted. The reason for using such scope of work is that a range in which the I/O list L1 can be changed according to the operator's role is finely limited.

In the example shown in FIG. 5, the scope of work includes "system" and "field" set for each of the items of the I/O list L1. A person (for example, a project leader) who controls the entire project or a person (for example, a system engineer or the like) who has authorization for a change can change the setting of the scope of work. "System" represents an indication of an item being permitted to be changed by a system engineer, and "field" represents an indication of an item permitted to be changed by a field engineer and a tester operating at a site of the plant. For this reason, as described above, in the example shown in FIG. 5, the permission flag is present in the row of "system engineer" and the column of "I/O protection. Since the scope of work of "I/O protection" is "system," "system engineer" can change "I/O protection." In contrast to this, in the example shown in FIG. 5, although the permission flag is present in the row of "field engineer" and the column of "I/O type," the scope of work of "I/O type" is "system" and is not included in the scope of work of "field engineer," and accordingly, "field engineer" cannot change "I/O type".

In a case where the authorization list L2 is displayed by the setting apparatus 17, as shown in FIG. 5, a range not included in the scope of work, for example, is in the grayed-out state. More specifically, in a case where the scope of work is "system," corresponding cells of "field engineer" and "tester" are in the grayed-out state. On the other hand, in a case where the scope of work is "field," a corresponding cell of "system engineer," is in the grayed-out state. A cell that enters into the grayed-out state cannot be changed (edited) regardless of the presence/absence of the permission flag. For this reason, although a permission flag is present in the row of "field engineer" and the column of "I/O type," the scope of work of "I/O type" is not included in the scope of work of "field engineer," and accordingly, "field engineer" cannot change the "I/O type."

By performing display according to the scope of work as shown in FIG. 5, an operator can instantly acquire the scope of work of each operator. In the authorization list L2, for example, since a permission flag set in a range that is in the grayed-out state becomes invalid, even a user having authorization for a change (the permission flag is set) as his or her role cannot change (edit) in a portion that enters into the grayed-out state.

<User List>

FIG. 6 is a diagram showing one example of the user list used by a setting apparatus according to one embodiment of the present invention. The user list L3, similar to the authorization list L2, as shown in FIG. 1, is generated by the engineering terminal 15 on the basis of the design information stored in the instrumentation database 16, and is received by the setting apparatus 17. The user list L3 is used for setting a role for an operator (user). This user list L3 is linked with the authorization list L2 by using a role name.

As shown in FIG. 6, the user list L3 is a list in which assignment information AS defining a role to be set is associated with an operator U1. In the example shown in FIG. 6, examples of the operator (user) U1 include "AAA," "BBB," and "CCC." In the example shown in FIG. 6, as the assignment information AS, there is the presence/absence ("checked check box" and "unchecked check box") of a flag for each combination of the operator (user) U1 and a role.

In a case where the flag is present (in the case of "checked check box"), it indicates that a role of the column is assigned to an operator of the row. On the other hand, in a case where the flag is absent (in the case of "unchecked check box"), a role of the column is not assigned to an operator of the row. In a case where the user list L3 is displayed by the engineering terminal 15 or the setting apparatus 17, as shown in FIG. 6, it indicates that each portion in which the flag is absent, for example, enters into the grayed-out state. By performing such a display, each operator can instantly acquire a role that is assigned to him or her.

As described above, since the user list L3 and the authorization list L2 are linked with each other by using a role name, authorization for a change of the I/O list L1 can be set for each operator using the setting apparatus 17. For this reason, for example, by assigning the role of "field engineer" to a plurality of users in the user list L3, even in a case where a plurality of operators perform settings and tests of a plurality of I/O modules 12 and field devices 11 in parallel by using a plurality of setting apparatuses 17, appropriate authorization setting can be performed.

[Setting Method]

Figure 7:
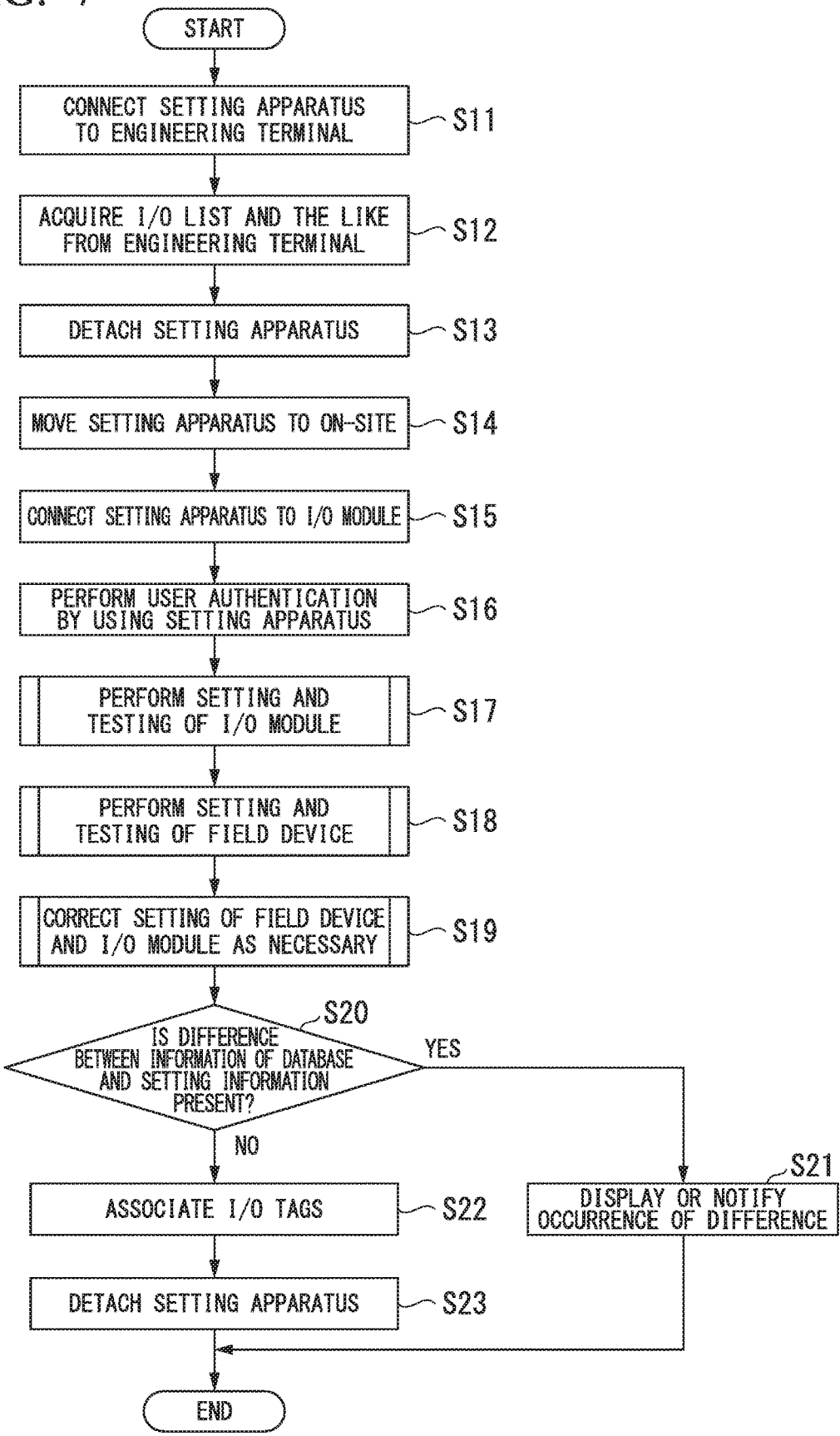
FIG. 7 is a flowchart showing an operation sequence of various settings performed using a setting apparatus according to one embodiment of the present invention.

FIG. 7 is a flowchart showing an operation sequence of various settings performed using a setting apparatus according to one embodiment of the present invention. When an operation is started, first, the upper layer interface 31 of the setting apparatus 17 is connected to the engineering terminal 15 (Step S11). The setting apparatus 17 may either be directly connected to the engineering terminal 15 or be indirectly connected to the engineering terminal 15 through the control network N.

Next, the I/O list L1, the authorization list L2, and the user list L3 generated by the engineering terminal 15 are acquired by the setting apparatus 17 and are stored in the storage 33 (Step S12). Thereafter, the setting apparatus 17 is detached from the engineering terminal 15 (Step S13). More specifically, in a case where the setting apparatus 17 is directly connected to the engineering terminal 15, the setting apparatus 17 is detached from the engineering terminal 15. On the other hand, in a case where the setting apparatus 17 is indirectly connected to the engineering terminal 15, the setting apparatus 17 is detached from the control network N. The detached setting apparatus 17 is moved to an on-site at which the field device 11 and the I/O module 12 are installed (Step S14).

The I/O list L1, the authorization list L2, and the user list L3 described above may be delivered from the engineering terminal 15 to the setting apparatus 17 through an electronic medium in the form of an electronic file or the like. In this way, in a case where information is exchanged between the engineering terminal 15 and the setting apparatus 17 through an electronic medium, Steps S11, S13, and S14 shown in FIG. 7 may be omitted.

Thereafter, the lower layer interface 32 of the setting apparatus 17 is connected to the setting apparatus connection interface 23 of the I/O module 12 (Step S15). While the setting apparatus 17 is connected to the I/O module 12, the controller 13 is not connected to the I/O module 12. For this reason, in the I/O module 12, by using the switch 28, the switch 27 is set to be in the closed state and the switch 26 is set to be in the open state.

Next, the setting apparatus 17 authenticates an operator (user) using the setting apparatus 17 (Step S16: first step). For example, by collating a user ID and a password for authentication input from the operation display 35 of the setting apparatus 17 with a user ID and a password for authentication that are stored in advance, a process of authenticating an operator using the setting apparatus 17 is performed by the user authenticator 34e of the control processor 34. The authentication of the operator may be performed either when the operator logs into the setting apparatus 17 or when setting and testing using the I/O list L1 are started.

When the authentication of the operator is completed, setting and testing of the I/O module 12 are performed by the setting apparatus 17 (Step S17). "Test" described here, for example, represents testing through the I/O channel CN for an input/output type such as input (AI) of an analog signal or output (AO) of an analog signal or a communication method such as 4 to 20 mA or FF. The example in which the setting and testing of the I/O module 12 are performed mainly by the setting apparatus 17 will be described.

Figure 8:
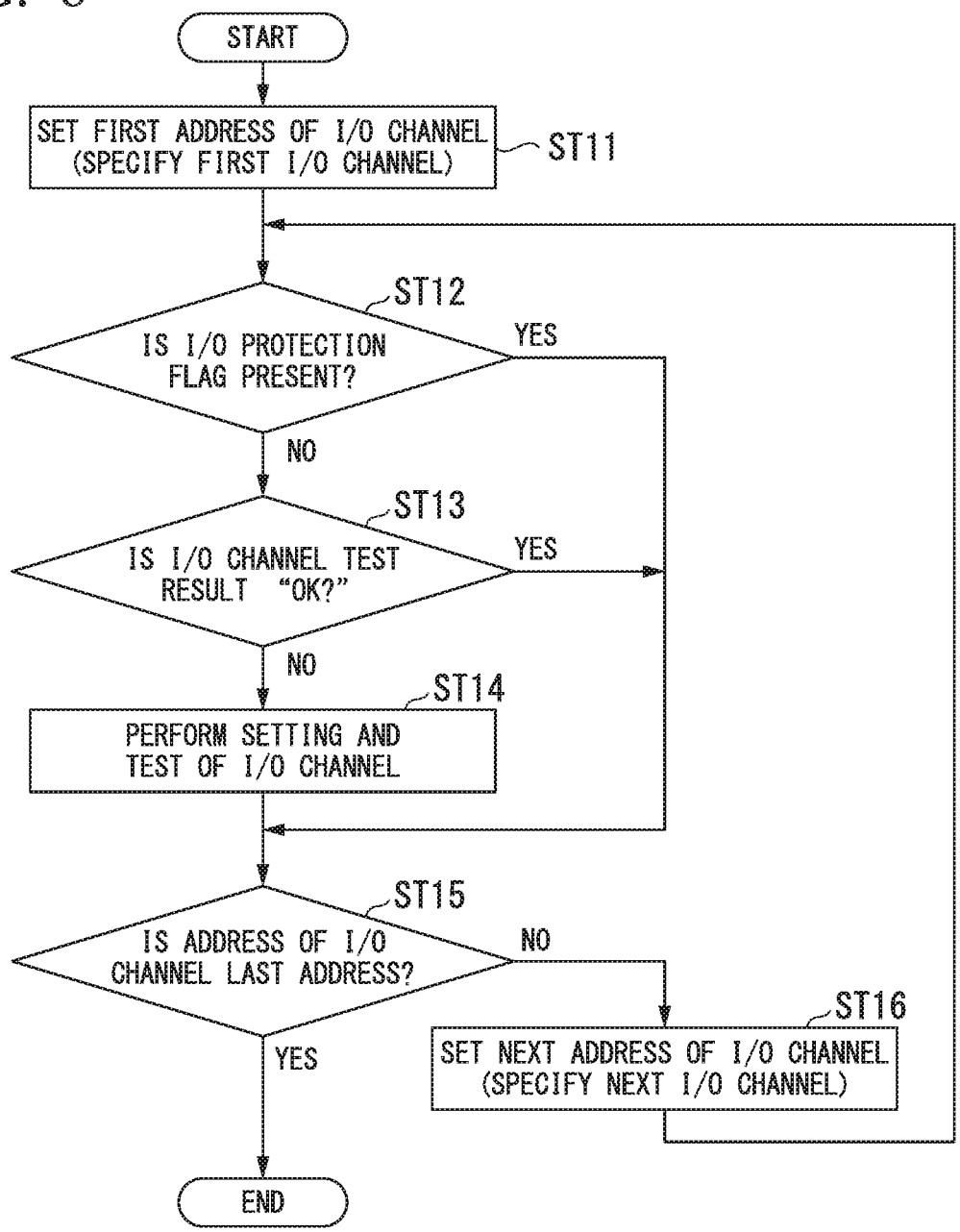
FIG. 8 is a flowchart showing details of a process performed by the setting apparatus in Step S17 shown in FIG. 7.

FIG. 8 is a flowchart showing details of a process performed by the setting apparatus in Step S17 shown in FIG. 7. When the process of the flowchart shown in FIG. 8 is started, first, a process of setting a first address of the I/O channel CN disposed in the I/O module 12 is performed by the control processor 34. Accordingly, a first I/O channel CN that is a target for setting and testing is specified (Step ST11).

Next, a process of determining the presence/absence of an I/O protection flag for the specified I/O channel CN is performed by the user authorizer 34f of the control processor 34 referring to the I/O protection information PR included in the I/O list L11 forming a part of the I/O list L1 (Step ST12). In a case where it is determined that the I/O protection flag is absent for the specified I/O channel CN (in a case where a result of the determination is "No"), the process of determining whether or not "I/O channel test result" included in the input and output information J1 of the I/O list L11 is "OK" is performed by the user authorizer 34f (Step ST13).

On the other hand, in a case where it is determined that "I/O channel test result" is not "OK" (in a case where a result of the determination of Step ST13 is "No"), setting and testing of the specified I/O channel CN are performed through the processes of the setting instructor 34a, the setting checker 34b, and the checker 34c of the control processor 34 (Step ST14). More specifically, first, the process of setting an I/O tag T1 for the specified I/O channel CN is performed by the setting instructor 34a. Next, a setting process relating to the input/output of the specified I/O channel CN is performed by the setting instructor 34a using the I/O list L11. Thereafter, testing for checking whether or not a connection between the specified I/O channel CN and the field device 11 is normally performed is performed by the setting checker 34b and the checker 34c.

In other words, in the specified I/O channel CN, the I/O protection information PR is not set (a result of the determination of Step ST12 is "No"), and "I/O channel test result" is not "OK" (the result of the determination of Step ST13 is "No"). For this reason, authorization for performing setting and testing of the specified I/O channel CN is assigned to an operator using the setting apparatus 17 by the user authorizer 34f (second step), and accordingly, the setting and testing of the specified I/O channel CN are performed.

On the other hand, in a case where it is determined that the I/O protection flag is present for the specified I/O channel CN (in a case where the result of the determination of Step ST12 is "Yes"), a change (editing) of the input and output information J1 for the specified I/O channel CN is disabled, and accordingly, the process of Step ST14 is not performed. In a case where "I/O channel test result" is "OK" (in a case where the result of the determination of Step ST12 is "Yes"), the testing is completed and re-testing is not necessary, and accordingly, the process of Step ST14 is not performed.

In a case where the process of Step ST14 is completed or in a case where any one of results of the determinations of Steps ST12 and ST13 is "Yes," the process of determining whether or not the address of the specified I/O channel CN is a last address is performed by the control processor 34 (Step ST15). In a case where it is determined that the address of the specified I/O channel CN is not the last address (in a case where a result of the determination of Step ST15 is "No"), the process of setting a next address of the I/O channel CN disposed in the I/O module 12 is performed by the control processor 34. In this way, the next I/O channel CN that is a target for setting and testing is specified (Step ST16).

There may be a case where no authorization for correcting the specified I/O channel CN is present or a case where a correction for the setting of the specified I/O channel CN is performed in Step S19 (details thereof will be described later) shown in FIG. 7. In such a case, even in a case where "I/O channel test result" is not "OK" (in a case where the result of the determination of Step ST13 is "No") in Step ST13 described above, the process of Step ST14 may not be performed, and the process may proceed to the process of Step ST15.

In a case where the next I/O channel CN that is a target for setting and testing is specified, the process of Steps ST12 to ST16 is repeated until the result of the determination of Step ST15 is "Yes." In this way, settings and tests of I/O channels CN of which the authorization for the settings and the tests are assigned to the operator among the I/O channels CN disposed in the I/O module 12 are sequentially performed. Then, in a case where it is determined that an address of a specified I/O channel CN is the last address (in a case where the result of the determination of Step ST15 is "Yes"), the series of processes shown in FIG. 8 are ended.

When the settings and the tests of the I/O module 12 are completed, setting and testing of the field device 11 are performed by the setting apparatus 17 (Step S18). "Test" described here represents testing through the I/O channel CN for the input/output type and the communication method described above. The example in which setting and testing of the field device 11 are performed mainly by the setting apparatus 17 will be described.

The setting and testing of the field device 11 are performed according to a process similar to that of the flowchart shown in FIG. 8. More specifically, by rephrasing "I/O channel test result" represented in Step ST13 shown in FIG. 8 with "field device test result" and rephrasing "I/O channel" represented in Step ST14 with "field device," a flowchart showing details of the process performed by the setting apparatus in Step S18 shown in FIG. 7 is formed.

In this process diagram, for an I/O channel CN in which the I/O protection information PR is not set (the result of the determination of Step ST12 is "No"), and "field device test result" is not "OK" (the result of the determination of Step ST13 after the rephrasing is "No"), authorization for performing setting and testing is assigned by the user authorizer 34f (second step). Then, setting and testing of a field device connected to the specified I/O channel CN is performed through the processes of the setting instructor 34a, the setting checker 34b, and the checker 34c of the control processor 34 (Step ST14).

There may be also a case where there is no authorization for correcting a field device connected to the specified I/O channel CN or a case where the setting of a field device connected to the specified I/O channel CN is corrected in Step S19 (details thereof will be described later) shown in FIG. 7. In such a case, even in a case where "field device test result" is not "OK" (in a case where the result of the determination of Step ST13 after the rephrasing is "No") in Step ST13 described above, the process of Step ST14 may not be performed, and the process may proceed to the process of Step ST15.

More specifically, in Step ST14, the process of setting an address (device address) unique to the field device 11 connected to the specified I/O channel CN by using the I/O list L11 shown in FIG. 4A and setting a unique operation condition and the like is performed by the setting instructor 34a. Thereafter, testing for checking whether or not a signal is normally input and output between the field device 11 connected to the specified I/O channel CN and the specified I/O channel CN and the like is performed by the setting checker 34b and the checker 34c.

Similar to the setting and testing of the I/O module 12 in Step S17, the process of Steps ST12 to ST16 is repeated until the result of the determination of Step ST15 is "Yes." In this way, settings and tests of the field devices 11 connected to the I/O channel CN of which authorization for setting and testing is assigned to the operator among the I/O channels CN disposed in the I/O module 12 are sequentially performed.

The first address of the I/O channel CN set in the setting and testing of the I/O module 12 (Step S17) and the setting and testing (Step S18) of the field device 11 may be arbitrarily set. For example, a start address may be set as the first address, or a middle address may be set as the first address. A range (the range of the I/O channel CN) in which setting and testing are performed for the I/O module 12 and the field device 11 may be configured to be manually designated by an operator, and the setting and testing may be performed only in the designated range.

When the above-described operations are ended, an operation for correcting setting of the field device 11 and the I/O module 12 is performed by the operator as necessary (Step S19). This operation is an operation for reconsidering and readjusting the setting of the field device 11 and the I/O module 12. In a case where the setting of the field device 11 and the I/O module 12 does not need to be corrected, this operation is omitted.

Figure 9:
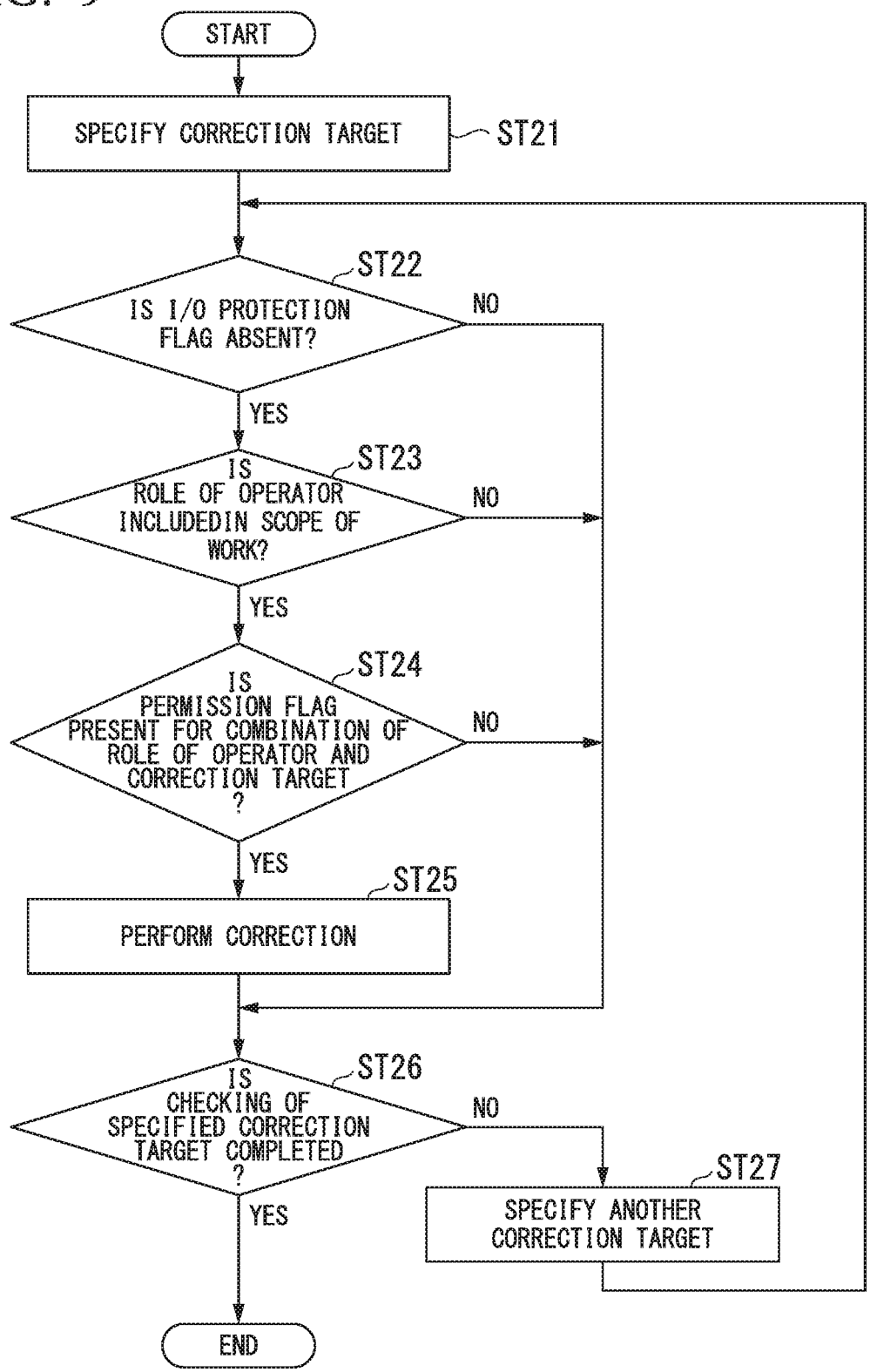
FIG. 9 is a flowchart showing details of a process performed by the setting apparatus in Step S19 shown in FIG. 7.

FIG. 9 is a flowchart showing details of the process performed by the setting apparatus in Step S19 shown in FIG. 7. When the process of the flowchart shown in FIG. 9 is started, first, a process of specifying a correction target is performed by the control processor 34 (Step ST21). For example, a process of searching the I/O list L11 and specifying a target is performed by the control processor 34 on the basis of an operator's instruction input from the operation display 35 of the setting apparatus 17.

Next, for a row in which the specified correction target is included, the process of determining the presence/absence of an I/O protection flag is performed by the user authorizer 34f of the control processor 34 referring to the I/O protection information PR included in the I/O list L11 forming a part of the I/O list L1 (Step ST22). In a case where it is determined that I/O protection flag is absent for the row in which the specified correction target is included (in a case where a result of the determination is "Yes"), a process of determining whether or not a role of the operator using the setting apparatus 17 is included in scope of work is performed by the user authorizer 34f referring to the authorization list L2 and the user list L3 (Step ST23).

In a case where it is determined that the role of the operator is included in the scope of work (in a case where a result of the determination of Step ST23 is "Yes"), the process of determining the presence/absence of the permission flag for a combination of the role of the operator and the specified correction target is performed by the user authorizer 34f referring to the authorization list L2 and the user list L3 (Step ST24). More specifically, a process of determining whether or not the permission flag is present at an intersection between a row in which the role of the operator using the setting apparatus 17 is defined and a column in which the specified correction target is defined in the authorization list L2 is performed.

In a case where it is determined that the permission flag is present (in a case where a result of the determination of Step ST24 is "Yes"), the specified correction target is corrected by the process of the control processor 34 (Step ST25). In other words, the I/O protection information PR is not set in the row in which the specified correction target is included (a result of the determination of Step ST22 is "Yes"), the role of the operator is included in the scope of work (the result of the determination of Step ST23 is "Yes"), and the permission flag is set for a combination of the role of the operator and the specified correction target (the result of the determination of Step ST24 is "Yes"). For this reason, authorization for setting the specified correction target is assigned to the operator using the setting apparatus 17 by the user authorizer 34f (second step), and thus, the specified correction target is corrected.

On the other hand, in a case where it is determined that the I/O protection flag is present for the specified correction target (in a case where a result of the determination of Step ST22 is "No"), the change (editing) of the input and output information J1 in the row of the I/O list L11 in which the specified correction target is included is disabled, and accordingly, the process of Step ST25 is not performed. In a case where the role of the operator is not included in the scope of work (in a case where the result of the determination of Step ST23 is "No"), the correction is not originally included in the operation range of the operator, and accordingly, the process of Step ST25 is not performed. In a case where the permission flag is not set (in a case where the result of the determination of Step ST24 is "No"), the change (editing) of the correction target is disabled, and accordingly, the process of Step ST25 is not performed. In a case where any one of the results of the determinations of Steps ST22, ST23, and ST24 is "No", for example, an indication representing that authorization relating to the correction is not included may be displayed on the operation display 35 to be notified to the operator.

In a case where the process of Step ST25 is completed or in a case where any one of the results of the determinations of Steps ST22, ST23, and ST24 is "No," the process of determining whether or not correction is completed is performed by the control processor 34 (Step ST26). In a case where it is determined that the correction is not completed (in a case where a result of the determination of Step ST26 is "No"), the process of specifying another correction target is performed by the control processor 34 (Step ST27). When another correction target is specified, the process of Steps ST22 to ST27 is repeated until the result of the determination of Step ST26 is "Yes." In this way, correction for the correction targets is sequentially performed. Then, in a case where it is determined that the correction is completed (in a case where the result of the determination of Step ST26 is "Yes"), the series of processes shown in FIG. 9 ends.

There may be a case where there is no authorization for correcting the specified field device or a case where a reason for non-completion of the correction of the specified field device is known (for example, there is insufficient time for the procurement of parts or the like). In such a case, even in a case where non-completion of the correction is determined in Step ST26 described above (in a case where the result of the determination of Step ST26 is "No"), the series of processes shown in FIG. 9 may be ended.

Next, the information of each of the databases stored in the storage 33 of the setting apparatus 17 and the setting of the I/O module 12 and the field device 11 are compared with each other, the presence/absence of a difference therebetween is determined by the control processor 34 (Step S20). In a case where it is determined that there is a difference (in a case where a result of the determination is "Yes"), the occurrence of the difference is displayed on the operation display 35 (Step S21), and a series of the processes ends. In a case where the difference occurs, the engineering terminal 15 may be notified of an indication of the occurrence of the difference after the setting apparatus 17 is connected to the engineering terminal 15.

On the other hand, in a case where it is determined that there is no difference (in a case where a result of the determination of Step S20 is "No"), a process of associating the I/O tag T2 (see FIG. 4B) used by the controller 13 with the I/O tag T1 set for each of the I/O channels CN of the I/O module 12 is performed by the I/O tag coupler 34d (Step S22). The association of the I/O tags T1 and T2 is performed using a method similar to the method disclosed in Patent Document 1. When the above-described operation ends, the setting apparatus 17 is detached from the I/O module 12 (Step S23), and the series of operations shown in FIG. 7 ends.

The setting apparatus 17 detached from the I/O module 12 in Step S23 may be reconnected to the engineering terminal 15, and the I/O list L11 on which information after the settings and the tests of the field device 11 and the I/O module 12 has been reflected may be output to the engineering terminal 15. The reason for this is for utilizing the I/O list L11 for the operation performed thereafter by storing the I/O list L11 on which the information after the settings and the tests has been reflected in the instrumentation database 16 through the engineering terminal 15.

The I/O list L11 (the list on which information after the settings and the tests is reflected) stored in the instrumentation database 16 requires that testing of at least a part of test targets is completed. In a case where such an I/O list L11 is stored in the instrumentation database 16, it is necessary to disable a change (protect a state) of the input and output information J1 of an I/O channel CN (an I/O channel CN for which "OK" is acquired as the I/O channel test result and the field device test result) of which the testing is completed. For this reason, before the I/O list L11 is stored in the instrumentation database 16, for example, in accordance with an instruction from a system engineer, the I/O protection information PR is set for the I/O channel CN of which the testing is completed, and the process of checking for the completion of the testing is performed.

The reason for allowing the I/O list L11, for which tests of at least a part of test targets is completed (in other words, an I/O list in which non-completed test targets are included), to be stored in the instrumentation database 16 is as follows. For example, a field engineer who is a dedicated staff member responsible for valves can perform only settings of valve parts, and accordingly, there may be a case where non-completion is intentionally allowed due to the impossibility of completion of all of the tests, insufficient time for the procurement of parts, or the like. In the case of parallel operation division, as the I/O list L11 in which completion flags are partially set is aggregated in the instrumentation database 16, the system engineer can acquire the whole progress by seeing the I/O list on which information after the settings and tests is reflected. For example, the system engineer can acquire a non-completed portion according to a notification of Step ST39 shown in FIG. 10 to be described later or the like.

Figure 10:
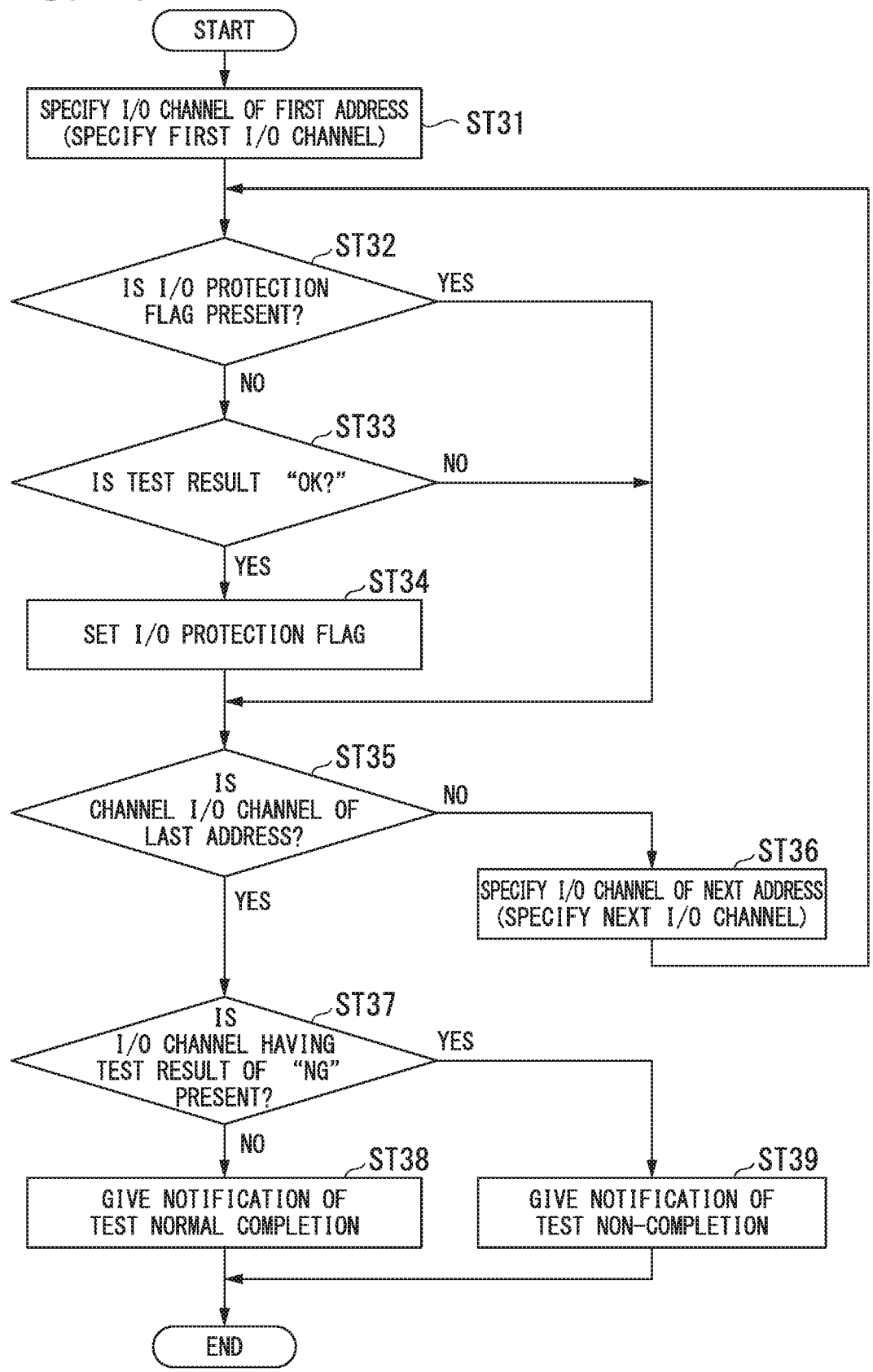
FIG. 10 is a flowchart showing a process of checking for completion of testing performed according to one embodiment of the present invention.

FIG. 10 is a flowchart showing a process of checking for the completion of testing performed according to one embodiment of the present invention. The process of the flowchart shown in FIG. 10, for example, is performed by the engineering terminal 15. When the process of the flowchart shown in FIG. 10 is started, first, a process of specifying an I/O channel CN of a first address is performed (Step ST31). More specifically, the process of specifying the I/O channel CN of the first address by searching the I/O list L11 output from the setting apparatus 17 to the engineering terminal 15 is performed.

Next, a process of determining the presence/absence of an I/O protection flag for the specified I/O channel CN is performed (Step ST32). In a case where it is determined that the I/O protection flag is not present for the specified I/O channel CN (in a case where a result of the determination is "No"), a process of determining whether or not test results (both "I/O channel test result" and "field device test result") for the specified I/O channel CN are "OK" is performed (Step ST33).

In a case where it is determined that the result of the tests of the specified I/O channel CN is "OK" (in a case where a result of the determination of Step ST33 is "Yes"), the process of setting the I/O protection information for the specified I/O channel CN is performed (Step ST34). On the other hand, in a case where it is determined that the I/O protection flag is present for the specified I/O channel CN (in a case where a result of the determination of Step ST32 is "Yes"), the I/O protection information PR is already set, and accordingly, the process of Step ST34 is not performed. On the other hand, in a case where it is determined that the result of the testing of the specified I/O channel CN is not "OK" (in a case where the result of the determination of Step ST33 is "No"), the testing is not completed, and accordingly, the process of Step ST34 is not performed.

In a case where the process of Step ST34 is completed, in a case where a result of the determination of Step ST32 is "Yes," or in a case where the result of the determination of Step ST33 is "No," the process of determining whether or not an address of the specified I/O channel CN is the last address (Step ST35) is performed (Step ST35). In a case where it is determined that the address of the specified I/O channel CN is not the last address (in a case where a result of the determination of Step ST35 is "No"), the process of specifying an I/O channel CN of the next address is performed. In this way, the next I/O channel CN is specified (Step ST36).

When the next I/O channel CN is specified, the process of Steps ST32 to ST36 is repeated until the result of the determination of Step ST35 is "Yes." In this way, the process of setting the I/O protection information PR for the I/O channels CN of which the I/O protection information PR is not set and the tests are completed among all of the I/O channels CN is sequentially performed.

In a case where it is determined that the address of the specified I/O channel CN is the last address (in a case where the result of the determination of Step ST35 is "Yes"), a process of determining whether or not an I/O channel CN for which a test result (at least one of the "I/O channel test result" and the "field device test result") is "NG" is present (Step ST37) is performed. In a case where it is determined that there is no I/O channel CN of which the result of the testing is "NG" (in a case where a result of the determination of Step ST37 is "No"), a process of giving a notification indicating normal completion of the testing is performed (Step ST38), and the series of processes shown in FIG. 10 ends. On the other hand, in a case where it is determined that there is an I/O channel CN of which the result of the testing is "NG" (in a case where a result of the determination of Step ST37 is "Yes"), a process of giving a notification indicating non-completion of the testing is performed (Step ST39), and the series of processes shown in FIG. 10 ends.

When the operations shown in FIG. 7 ends, the I/O module 12 of which the setting is completed is connected to the controller 13. In the I/O module 12, by the switch 28, the switch 26 is set to be in the closed state and the switch 27 is set to be in the open state. Then, whether or not transmission/reception of signals between the I/O module 12 and the operation monitoring terminal 14 is normally performed is checked, and whether or not transmission/reception of signals between the field device 11 and the operation monitoring terminal 14 is normally performed is checked. Thereafter, a test run of the process control system 1 is performed, and the process proceeds to full operation.

As above, in this embodiment, an operator using the setting apparatus 17 performing a setting of the I/O module 12 connecting the plurality of field devices 11 to the controller 13 is authenticated, and, on the basis of the I/O list L1, the authorization list L2, and the user list L3 previously set, operation authorization of an operation that can be performed by the authenticated operator using the setting apparatus 17 is assigned. In the I/O list L11 forming a part of the I/O list L1, the I/O protection information PR defining whether or not a change of the input and output information J1 is enabled is included for each of the I/O channels CN disposed in the I/O module 12, and, in the authorization list L2, the enable/disable information ED defining whether or not a change of content is enabled according to a role of the operator is included for each of the items or the like of the input and output information J1. For this reason, a wasteful operation and an erroneous setting can be effectively prevented, and the operator can be effectively managed according to his or her skills.

For example, even in a case where the I/O list L1, the authorization list L2, and the user list L3 that are identical for a plurality of setting apparatuses 17 are distributed from the engineering terminal 15, operation authorization according to an operator is assigned through user authentication, and accordingly, an erroneous change of scope of work of other operators can be prevented. Even when a plurality of operators access the same I/O module 12 at different time points, a later inappropriate operation of another operator's erroneously changing an item of which the setting and testing is completed by a certain operator can be prevented.

As above, the setting apparatus, the setting method, the storage medium, and the terminal apparatus according to one embodiment of the present invention have been described, and the present invention can be freely changed within the scope of the present invention without being limited to the above-described embodiment. For example, in the above-described embodiment, an example has been described in which the I/O module 12 includes each of the I/O channels CN for which an input (AI) of an analog signal, an output (AO) of an analog signal, an input (DI) of a digital signal, and an output (DO) of a digital signal can be set, and the setting apparatus 17 sets the I/O channel CN by using the I/O list L1 in which "I/O type" is included in the input and output information J1. However, an I/O module 12 for which the above-described input/output cannot be set can also be set and tested using the setting apparatus 17.

In the above-described embodiment, an example has been described in which "I/O channel test result" and "field device test result" are included in the input and output information J1 of the I/O list L11. However, in addition to these, by adding "operator's name" and "test completion time" to the input and output information J1, an operator's name and a time of a time point when the test result is acquired may be recorded. In such a case, for example, a test result using an operation report can be easily checked.

In the above-described embodiment, an example has been described in which the I/O protection information PR used for protecting a state of the I/O channel CN is set for each of the I/O channels CN of the I/O list L11. However, an I/O protection flag used for protecting information relating to the setting and testing of the I/O channel CN and an I/O protection flag used for protecting information relating to the setting and testing of the field device 11 may be separately provided. By providing such an I/O protection flag, information can be protected more flexibly.

In the above-described embodiment, an example has been described in which operation authorization of an operation that can be performed using the setting apparatus 17 by an operator (authenticated operator) using the setting apparatus 17 is assigned on the basis of the I/O list L1, the authorization list L2, and the user list L3 acquired from the engineering terminal 15. However, a person having authorization for changing and editing, such as a system engineer, for example, may be enabled to edit a user list, change scope of work, and change the user authorization on the setting apparatus 17 without being limited by the place. In such a case, for example, a case may be considered in which, even in an environment in which a simple access to the engineering terminal 15 cannot be made, an operator can be changed, and accordingly, an operation can be performed in a speedy manner. In such a case, in a case where the authorization for editing the user list, for example, is assigned only to the administrator, flexible execution of an operation can be realized with scope of work limited according to a skill of the operator.

After each operator performs an operation for his or her setting targets (the I/O module 12, the field device 11, and the like), information (setting information, operation completion/non-completion information, a test result, and the like) may be stored in the storage 33 inside the setting apparatus 17. This information may be regarded as representing, so to speak, an actual state of an operation target part. Thus, this setting apparatus (information) may be used as a part of a state information extracting apparatus 10 (FIGS. 2 and 8) disclosed in Japanese Patent No. 5652444.

In the above-described embodiment, while an example has been described in which the I/O protection information PR is included in the I/O list L11, the I/O protection information may not necessarily be included in the I/O list L11. For example, the I/O protection information PR may be prepared as a list other than the I/O list L11 in a state in which it is associated with the I/O tag T1 of the I/O list L11. In the above-described embodiment, while an example in which the scope of work is included in the authorization list L2 has been described, the scope of work may be prepared as a list other than the authorization list L2.

In the above-described embodiment, while the system engineer has been described as setting the I/O protection information, the setting of the I/O protection information is not limited to being done by the system engineer. For example, at a time of regular repairs of a plant, a person (for example, a project leader) controlling an entire project or a person having authorization for changing may set the I/O protection information such that a field engineer can perform a necessary operation.

The I/O module set by the setting apparatus 17 is not limited to being connected to the controller 13 of the process control system 1, but may be connected to a (safety) controller of a safety instrumentation system described below. The safety instrumentation system is a system achieving protection of expensive facilities as well as prevention of injuries and environmental contamination in advance by determining whether or not an abnormal situation occurs in a plant and reliably stopping the plant to a safe state at a time at which an abnormality occurs or at an emergency time, and includes a safety controller (control apparatus) executing a safety control logic for realizing safety control in a case where an abnormal situation is determined to occur in the plant on the basis of necessary communication data acquired by communicating with a field device or another safety controller.

What is claimed is:

1. A setting apparatus, comprising:
   an authenticator configured to authenticate an operator using the setting apparatus, the setting apparatus performing a setting of an I/O module including a plurality of first connectors to which field devices are connectable and a second connector to which a controller controlling the field devices is connectable; and
   an authorizer configured to assign operation authorization to the operator authenticated by the authenticator on the basis of previously set authorization definition information, the operation authorization allowing the operator to perform at least one operation using the setting apparatus, the authorization definition information including an I/O list, an authorization list, and a user list, the I/O list including first information defining whether or not a change of input and output information of the field device is permitted for each of the first connectors, the authorization list including second information defining whether or not a change of each item of the input and output information is permitted for each role of the operator, and the user list including third information in which the operator and the role of the operator are associated with each other,
   wherein the authorizer is configured to refer the first information in the I/O list and to determine whether or not the change of input and output information of the field device is permitted for each of the first connectors, and
   if the authorizer determines that the change of input and output information of the field device is permitted for each of the first connectors, the authorizer is configured to refer the authorization list and the user list and to determine whether or not the change of each item of the input and output information is permitted on the basis of the role of the operator authenticated by the authenticator.

2. The setting apparatus according to claim 1, wherein the second information includes information representing scope of work for each item of the input and output information, the scope of work defining which role an operation is assigned to, the operation being associated with each item of the input and output information, and the authorizer is configured to assign the operation authorization to the operator on the basis of the scope of work.

3. The setting apparatus according to claim 1, further comprising:
   a storage storing the authorization definition information, wherein the authorizer is configured to assign the operation authorization to the operator on the basis of the authorization definition information read from the storage.

4. The setting apparatus according to claim 3, wherein the first information is stored in the storage in association with the input and output information of each of the first connectors.

5. The setting apparatus according to claim 1, further comprising:
   an acquirer configured to acquire the authorization definition information from the outside of the setting apparatus.

6. The setting apparatus according to claim 1, wherein
the authorizer is configured to assign to the operator the operation authorization of changing the input and output information of the field device connected to the first connector in which the change of the input and output information is permitted in the first information.

7. The setting apparatus according to claim 6, wherein
the authorizer is configured to assign to the operator the operation authorization of changing the item of the input and output information in which the change of the item is permitted on the basis of the role of the operator in the second information.

8. The setting apparatus according to claim 2, wherein
the authorizer is configured to assign to the operator the operation authorization of changing the item of the input and output information when the change of the item is permitted on the basis of the role of the operator in the second information and the role of the operator is included in the scope of work.

9. The setting apparatus according to claim 8, wherein
the authorizer is configured not to assign to the operator the operation authorization of changing the item of the input and output information when the change of the item is permitted on the basis of the role of the operator in the second information and the role of the operator is not included in the scope of work.

10. A setting method using a setting apparatus performing a setting of an I/O module including a plurality of first connectors to which field devices are connectable and a second connector to which a controller controlling the field devices is connectable, comprising:
authenticating an operator using the setting apparatus; and
assigning operation authorization to the operator authenticated on the basis of previously set authorization definition information, the operation authorization allowing the operator to perform at least one operation using the setting apparatus, the authorization definition information including an I/O list, an authorization list, and a user list, the I/O list including first information defining whether or not a change of input and output information of the field device is permitted for each of the first connectors, the authorization list including second information defining whether or not a change of each item of the input and output information is permitted for each role of the operator, the user list including third information in which the operator and the role of the operator are associated with each other,
wherein assigning the operation authorization comprises:
referring the first information in the I/O list and determining whether or not the change of input and output information of the field device is permitted for each of the first connectors, and
if it is determined that the change of input and output information of the field device is permitted for each of the first connectors, referring the authorization list and the user list and determining whether or not the change of each item of the input and output information is permitted on the basis of the role of the operator authenticated.

11. The setting method according to claim 10, wherein
the second information includes information representing scope of work for each item of the input and output information, the scope of work defining which role an operation is assigned to, the operation being associated with each item of the input and output information, and assigning the operation authorization to the operator comprises assigning the operation authorization to the operator on the basis of the scope of work.

12. The setting method according to claim 10, wherein
the setting apparatus further comprises a storage storing the authorization definition information,
assigning the operation authorization to the operator comprises assigning the operation authorization to the operator on the basis of the authorization definition information read from the storage.

13. The setting method according to claim 12, wherein
the first information is stored in the storage in association with the input and output information of each of the first connectors.

14. The setting method according to claim 10, further comprising:
acquiring the authorization definition information from the outside of the setting apparatus.

15. The setting method according to claim 10, wherein
assigning the operation authorization to the operator comprises assigning to the operator the operation authorization of changing the input and output information of the field device connected to the first connector in which the change of the input and output information is permitted in the first information.

16. A non-transitory computer-readable storage medium storing a setting program causing a computer to function as a setting apparatus that performs a setting of an I/O module including a plurality of first connectors to which field devices are connectable and a second connector to which a controller controlling the field devices is connectable, the setting program causing the computer to:
authenticate an operator using the setting apparatus; and
assign operation authorization to the operator authenticated on the basis of previously set authorization definition information, the operation authorization allowing the operator to perform at least one operation using the setting apparatus, the authorization definition information including an I/O list, an authorization list, and a user list, the I/O list including first information defining whether or not a change of input and output information of the field device is permitted for each of the first connectors, the authorization list including second information defining whether or not a change of each item of the input and output information is permitted for each role of the operator, the user list including third information in which the operator and the role of the operator are associated with each other,
wherein assigning the operation authorization comprises:
referring the first information in the I/O list and determining whether or not the change of input and output information of the field device is permitted for each of the first connectors, and
if it is determined that the change of input and output information of the field device is permitted for each of the first connectors, referring the authorization list and the user list and determining whether or not the change of each item of the input and output information is permitted on the basis of the role of the operator authenticated.

17. A terminal apparatus that generates the authorization definition information to be used by the setting apparatus according to claim 1 using design information of at least the field devices, the I/O module, and the controller stored in a database.

18. The terminal apparatus according to claim 17, wherein the terminal apparatus is configured to copy the authorization definition information and input the copied authorization definition information into the setting apparatus when the setting apparatus is connected to the terminal apparatus.

* * * * *